United States Patent [19]

Berta et al.

[11] Patent Number: 4,482,681

[45] Date of Patent: Nov. 13, 1984

[54] CROSSLINKING HALOGEN-CONTAINING POLYMERS

[75] Inventors: Dominic A. Berta; Vernon L. Kyllingstad, both of Wilmington, Del.

[73] Assignee: Hercules Incorporated, Wilmington, Del.

[21] Appl. No.: 427,329

[22] Filed: Sep. 29, 1982

[30] Foreign Application Priority Data

Oct. 22, 1981 [GB] United Kingdom ............... 8131937

[51] Int. Cl.$^3$ .................... C08F 8/34; C08G 65/32
[52] U.S. Cl. ................ 525/349; 525/334.1; 528/421
[58] Field of Search ............. 525/349, 334.1; 528/421

[56] References Cited

U.S. PATENT DOCUMENTS

| | | | |
|---|---|---|---|
| 4,128,510 | 12/1978 | Richwine | 528/36 |
| 4,234,705 | 11/1980 | Matoba | 525/329 |
| 4,288,576 | 9/1981 | Richwine | 525/349 |
| 4,342,851 | 8/1982 | Suzui et al. | 525/403 |
| 4,399,262 | 8/1983 | Jablonski | 525/349 |

*Primary Examiner*—Christopher A. Henderson
*Attorney, Agent, or Firm*—Jeffrey F. Craft; Marion C. Staves

[57] ABSTRACT

Halogen-containing polymers can be crosslinked by heat-curing with a crosslinking system made up of a crosslinking agent which is either a polymercaptan or an ester derivative thereof, a basic material and a hydrated salt. When the hydrated salt is chosen so that it releases its water of hydration during heat-curing the rate of crosslinking is enhanced.

2 Claims, No Drawings

CROSSLINKING HALOGEN-CONTAINING POLYMERS

BACKGROUND OF THE INVENTION

This invention relates to the crosslinking of halogen-containing polymers. More particularly it relates to a process for crosslinking a halogen-containing polymer by heat-curing the polymer in the presence of a crosslinking system wherein the crosslinking system contains a polymercaptan crosslinking agent, a basic material and a hydrated salt. The invention also relates to the crosslinked polymer composition so produced.

It is known in the art that a halogen-containing polymer can be crosslinked by heat-curing the polymer in the presence of a crosslinking system containing a basic material and a crosslinking agent which is either a polymercaptan or an ester derivative thereof. See, for example, U.S. Pat. Nos. 4,128,510 and 4,288,576. Unfortunately, when this crosslinking system is used the rate of cure is often undesirably slow. It is also known that when either the basic material or a filler contains an appreciable amount of moisture there is premature curing or scorching of the crosslinkable composition.

SUMMARY OF THE INVENTION

It has now been found that the crosslinking of halogen-containing polymers which have been compounded with a crosslinking system comprising a crosslinking agent which is either a polymercaptan or an ester derivative thereof and a basic material is greatly improved when a hydrated salt is added to the crosslinking system; the hydrated salt being chosen so that it releases its water of hydration during heat-curing. When such a hydrated salt is incorporated into the crosslinking system, the rate of crosslinking is enhanced.

DETAILED DESCRIPTION OF THE PREFERRED EMBODIMENTS

The polymer to be crosslinked in accordance with this invention can be any halogen-containing, saturated or unsaturated polymer or copolymer containing at least 1%, and more preferably about 5%, by weight of halogen. Typical of the halogen-containing polymers are homopolymers of epichlorohydrin; co-polymers of epichlorohydrin and ethylene oxide or propylene oxide; copolymers of epihalohydrin with an ethylenically unsaturated epoxide such as an unsaturated glycidyl ether, a monoepoxide of a diene or a polyene and a glycidyl ester as described in U.S. Pat. No. 3,158,591; polymeric epoxides comprised of a copolymer of propylene oxide or higher alkylene oxide with an ethylenically unsaturated epoxide, which may be modified with an extending oil as described in U.S. Pat. No. 3,262,902; polychloroprene; chlorosulfonated polyethylene; chlorinated high density polyethylene; chlorinated polypropylene; polychloroalkylacrylate; poly(vinyl fluoride); poly(vinyl chloride); poly(vinylidene chloride); chlorobutyl rubber and bromobutyl rubber.

In addition, the process of this invention can be used in the crosslinking of blends of halogen-containing polymers, or halogen-containing polymers blended with non-halogen-containing polymers. The only requirement is that there be sufficient halogen-containing polymer present in the blend to effect crosslinking.

The crosslinking agents which are employed in accordance with the invention are known in the art and include 2,5-dimercapto-1,3,4-thiadiazole and various of its ester derivatives as described in U.S. Pat. No. 4,128,510 (hereinafter referred to as '510); 2,4,6-trimercapto-1,3,5-triazine (trithiocyanuric acid); various dimercaptotriazoles as described in U.S. Pat. No. 4,234,705; and various 2,4-dithiohydantoins as described in U.S. Pat. No. 4,342,851. The ester derivatives of 2,5-dimercapto-1,3,4-thiadiazole described in '510 are preferred crosslinking agents. Therefore, the entire patent is herein incorporated by reference. The preferred esters are listed from column 2, lines 36 to column 5, line 22 of '510. 2-Mercapto-1,3,4-thiadiazole-5-thio benzoate is particularly preferred.

Additionally, a basic material, or a material which will become basic on heating to the curing temperature is required for use in the crosslinking system. The use of such materials is known in the art. The basic material must be essentially dry so as not to cause premature curing (scorching) of the compositions during heat curing. Typical basic materials are basic metal oxides and hydroxides as well as their salts with weak acids such as, for example, zinc oxide, magnesium oxide, calcium oxide, calcium hydroxide, barium oxide, zinc carbonate, barium carbonate, sodium phenoxide, sodium acetate. Also useful as basic materials are the various amines described in U.S. Pat. No. 4,288,576. The basic material can be chosen so that it doubles as a filler.

It is undesirable to use zinc oxide or zinc salts as the basic material in certain cases, such as with chlorosulfonated polyethylene, chlorinated polyethylene, poly(vinyl chloride) or poly(vinylidene chloride), because zinc chloride formed in situ during the vulcanization process can cause undesirable effects on the heat aging characteristics of the crosslinked polymer.

Now, it has been found that there is a marked improvement in the rate of crosslinking when a hydrated salt is added to the crosslinking agent and the basic material. The hydrated salt must be one that releases its water of hydration during curing. This means that the hydrated salt must retain its water of hydration at the temperature at which a polymer and crosslinking system is compounded, which can be as high as 125° C., but then releases it upon curing which can be at temperatures as low as 140° C. It is preferred to use magnesium sulfate heptahydrate as the hydrated salt. One mole of this salt releases six moles of water of hydration on heating to a temperature of 150° C. Other representative hydrated salts which are applicable include sodium sulfite heptahydrate and sodium citrate pentahydrate which release their water of hydration at 150° C. and potassium aluminum sulfate dodecahydrate from which nine moles of water are released at 65° C. and three moles at 200° C.

In addition to the crosslinking agent, basic material and hydrated salt, other ingredients are normally incorporated. The additives commonly used in rubber vulcanization can be used here also as, for example, extenders, fillers, pigments, antioxidants, plasticizers, softeners, etc. The presence of a filler and in particular, carbon black, is beneficial and, as in rubber compounding, gives very advantageous results. As previously mentioned the basic material can be chosen so that it doubles as a filler.

It is often desirable in the case of some of the halogen-containing polymers having relatively unreactive halogens to use an accelerator containing aliphatic or aromatic amine or quaternary nitrogen groups. Particularly useful accelerators are the reaction products of aniline and toluidine with aldehydes such as formaldehyde, butyraldehyde, heptaldehyde and acrolein, and of urea with aromatic acids, as well as aryl substituted guanidines such as diphenyl and di-o-tolyl guanidines.

In the case of some polymers, it may be desirable to add a carboxylic acid to the crosslinkable composition to act as a scorch retarder during the compounding step when calcium oxide or calcium hydroxide is used as the basic material.

Varied amounts of the components of the crosslinking system can be added and the optimum amount of each component will depend upon the degree of crosslinking desired and the nature of the specific crosslinking system employed. Generally, the amounts added (based on 100 parts of the polymer) will be within the following ranges: crosslinking agent, broadly from about 0.1 to about 10 parts, preferably from about 0.5 to about 5 parts; basic material, broadly from about 0.25 to about 100 parts (larger amounts being employed when the basic material is also used as a filler), more preferably from about 0.5 to 50 parts, most preferably from about 1.0 to about 20 parts; hydrated salt in an amount which will release 0.25 to 5 parts, preferably 0.5 to 3.5 parts water on heat-curing. If an accelerator is employed, it is added in an amount broadly from about 0.01 to about 10 parts, more preferably from about 0.05 to about 5 parts, most preferably from about 0.1 to about 2 parts.

The crosslinking agent, basic material, hydrated salt and additives, if any are used, can be compounded with the polymer in any desired fashion. For example, they can be uniformly blended with the polymer by simply milling on a conventional rubber mill or mixing in a Banbury type mixer. By this means, the agents are uniformly distributed throughout the polymer and uniform crosslinking is effected when the blend is subjected to heat-curing. It is generally preferable to mill at temperatures within the range of from about 50° C. to about 125° C. However, the blends, unless compounded with a large amount of accelerator, are highly scorch-resistant below about 125° C. Other methods of compounding the crosslinking system with the polymer will be apparent to those skilled in the art.

The conditions for cure under which the crosslinking is effected can be varied over a wide range. Crosslinking is effected at elevated temperatures. In general, the curing temperature will be broadly within the range of from about 140° C. to about 260° C., more preferably from about 150° C. to about 225° C., and most preferably from about 150° C. to about 205° C. The time will vary inversely with the temperature and will range from about 5 seconds to 10 hours, normally from 30 seconds to about 120 minutes. While the curing process can be conducted in air or in a liquid heat transfer medium at normal atmospheric pressure, it will generally be conducted in a metal mold under a compression of at least about 500 p.s.i. or in a steam autoclave at the pressure required for the desired temperature.

It has also been found that the addition of a hydrated salt to a composition consisting of a halogen-containing polymer, a basic material and a crosslinking agent which is either a polymercaptan or an ester derivative thereof results in yet another advantage. A smaller quantity of a basic material or a less active basic material can be employed than would otherwise be necessary to give a desired crosslinking rate. This use of less basic material or a less active one results in a less scorchy composition; especially when the uncured composition may be stored under humid conditions for an extended period. Such tendency toward premature curing is most prevalent with a chlorinated polymer such as the homopolymer and copolymers of epichlorohydrin which are somewhat hygroscopic.

Moreover it has been observed that the addition of some hydrated salts, e.g. the magnesium sulfate heptahydrate, improves the modulus and tensile strength and elongation and compression set, of the crosslinked product. These characteristics are all indicative of a high crosslink level.

The following examples further illustrate the process and the product of the invention and are not a limitation thereof. In all of the examples a master batch of carbon black and polymer was blended in a Banbury mill. The other ingredients were then added in a two roll mill. All weights are based on the weight of the polymer unless clearly indicated otherwise.

EXAMPLES 1-4

Examples 1 through 4 illustrate crosslinking systems which contain varying amounts of magnesium sulfate heptahydrate-from none in Example 1 to 7 parts per hundred, based on the weight of the polymer, in Examples 3 and 4. The halogen-containing polymer is an equimolar copolymer of epichlorohydrin and ethylene oxide. This copolymer was compounded with a crosslinking system of 2-mercapto-1,3,4-thiadiazole-5-thiobenzoate and barium carbonate. The details of all the compositions are set out in Table 1. In Examples 1, 3 and 4 the crosslinking rate at 182° C. was measured using an oscillating disc rheometer (ODR) method, ASTM D2084. A minimum torque was measured at 0 time. Subsequently, both the time required for a one point rise and the torque after 12 minutes were measured. The compositions were cured for 45 minutes at 160° C. Table 1 also shows the physical properties of the cured compositions.

TABLE 1

| EXAMPLE | 1 | 2 | 3 | 4 |
|---|---|---|---|---|
| Formula (parts by weight) | | | | |
| Copolymer of epichlorohydrin and ethylene oxide | 100 | 100 | 100 | 100 |
| Carbon black | 70 | 70 | 70 | 70 |
| Dioctylphthalate | 7 | 7 | 7 | 10 |
| Stearic Acid | 2.5 | 2.5 | 2.5 | 2.5 |
| Nickel dibutyl dithiocarbamate | 1.0 | 1.0 | 1.0 | 1.0 |
| Nickel dimethyl dithiocarbamate | 1.0 | 1.0 | 1.0 | 1.0 |
| Barium Carbonate | 3 | 3 | 3 | 3 |
| MgSO$_4$.7H$_2$O | — | 3 | 7 | 7 |
| 2-Mercapto-1,3,4-thiadiazole-5-thiobenzoate (66% on clay) | 3 | 3 | 3 | 3 |
| Butyraldehyde-Aniline Condensation product | 0.2 | 0.2 | 0.2 | — |
| Crosslinking Rate (ODR) | | | | |
| Minimum torque (in-lb) | 18 | — | 16 | 15 |
| Time to 1 point rise (sec) | 85 | — | 55 | 65 |
| Torque - 12 minutes | 43 | — | 98 | 86 |
| Physical Properties | | | | |
| 100% Modulus (psi) | 250 | 630 | 715 | 650 |
| 200% Modulus (psi) | 540 | 1260 | 1235 | 1120 |
| Tensile strength (psi) | 1480 | 1770 | 1648 | 1610 |
| % Elongation | 730 | 370 | 340 | 410 |
| Shore A Hardness | 72 | 78 | — | — |
| % Compression Set (22 hrs. at 125° C.) | 81 | 30 | 30 | 35 |

EXAMPLES 5-8

These examples illustrate the use of magnesium sulfate heptahydrate in increasing the rate of crosslinking of chlorinated polyethylene with 2-mercapto-1,3,4-thiadiazole-5-thio benzoate in the presence of a tertiary amine vulcanization accelerator.

A chlorinated polyethylene composition was made up as follows:

| Formula (parts by weight) | |
|---|---|
| Chlorinated polyethylene (36% chlorine) | 100 parts |
| Calcium carbonate | 68 parts |
| Carbon black | 35 parts |
| Aromatic hydrocarbon | 35 parts |
| Magnesium oxide | 5 parts |
| Amine-aldehyde adduct accelerator | 0.8 parts |
| 2-Mercapto-1,3,4-thiadiazole-5-thio-benzoate | 1.7 parts |

The different amounts of magnesium sulfate heptahydrate as detailed in Table 2, were added to three separate aliquots of the formulation.

TABLE 2

| EXAMPLE | 5 | 6 | 7 | 8 |
|---|---|---|---|---|
| $MgSO_4.7H_2O$ added (parts) | — | 0.5 | 1.0 | 1.5 |
| Cure Rate (ODR Cure at 182°) | | | | |
| Minimum Torque (in-lb) | 17 | 12 | 12 | 14 |
| Time to 1 point rise (sec) | 13 | 11 | 11 | 9 |
| Torque - 1 min. | 22 | 23 | 26 | 32 |

EXAMPLES 9-10

These examples show the use of 2,5-dimercapto-1,3,4-thiadiazole and trithiocyanuric acid as crosslinking agents for the equimolar copolymer of epichlorhydrin and ethylene oxide in the presence of barium carbonate and magnesium sulfate heptahydrate.

TABLE 3

| EXAMPLE | 9 | 10 |
|---|---|---|
| Formula (part by weight) | | |
| Copolymer of epichlorohydrin and ethylene oxide | 100 | 100 |
| Carbon Black | 70 | 70 |
| Dioctylphthalate | 7 | 7 |
| Sorbitan monostearate processing aid | 5 | 5 |
| Barium Carbonate | 3.0 | 3.0 |
| Nickel dibutyl dithiocarbamate | 1.0 | 1.0 |
| Nickel dimethyl dithiocarbamate | 1.0 | 1.0 |
| $MgSO_4.7H_2O$ | 5 | 5 |
| Butyraldehyde-Aniline Condensation | 0.2 | — |
| 2,5-Dimercapto-1,3,4-thiadiazole | 1.4 | — |
| Trithiocyanuric Acid | — | 1.2 |
| Crosslinking Rate (ODR Cure at 182°) | | |
| Minimum Torque (in-lb) | 14 | 12 |
| Time to 1 point rise (sec) | 35 | 80 |
| Torque - 1 min. | 30 | 12 |
| Torque - 6 min. | 103 | 72 |
| Torque - 12 min. | 110 | 96 |

EXAMPLES 11-13

These examples show the use of 2-mercapto-1,3,4-thiadiazole-5-thiobenzoate as a crosslinker for chlorinated polyethylene compounded with magnesium oxide, using magnesium sulfate heptahydrate and potassium aluminum sulfate dodecahydrate as the hydrated salts.

TABLE 4

| Example | 11 | 12 | 13 |
|---|---|---|---|
| Formula (parts by weight) | | | |
| Chlorinated polyethylene (36% chlorine) | 100 | 100 | 100 |
| Carbon black | 50 | 50 | 50 |
| Aromatic hydrocarbon | 30 | 30 | 30 |
| Magnesium oxide | 6 | 6 | 6 |
| Butyraldehyde-Aniline Condensation product | 0.8 | 0.8 | 0.8 |
| 2-Mercapto-1,3,4-thiadiazole-5-thiobenzoate | 2.5 | 2.5 | 2.5 |
| $MgSO_4.7H_2O$ | — | 1 | — |
| $KAlSO_4.12H_2O$ | — | — | 1 |
| Crosslinking Rate (ODR Cure at 182°) | | | |
| Minimum Torque (in-lb) | 11 | 11 | 11.5 |
| Time to 1 point rise (sec) | 102 | 30 | 48 |
| Torque - 1 min. | 11 | 11 | 12 |
| Torque - 6 min. | 16 | 32 | 26 |
| Torque - 12 min. | 20 | 38 | 33 |

What we claim and desire to protect by Letters Patent is:

1. The process of crosslinking a halogen-containing polymer which comprises heating said polymer in the presence of a basic material; a crosslinking agent chosen from the group consisting of 2,5-dimercapto-1,3,4-thiadiazole, monobenzoate derivatives of 2,5-dimercapto-1,3,4-thiadiazole; trithiocyanuric acid; 2,4-dithiohydantoins; and dibenzoate derivatives of 2,5-dimercapto-1,3,4-thiadiazole; and a hydrated salt chosen from the group comprising magnesium sulfate heptahydrate, sodium sulfite heptahydrate, sodium citrate pentahydrate and potassium aluminum sulfate dodecahydrate.

2. A heat curable composition comprising a halogen-containing polymer; a basic material; a crosslinking agent chosen from the group consisting of 2,5-dimercapto-1,3,4-thiadiazole; monobenzoate derivatives of 2,5-dimercapto 1,3,4-thiadiazole; trithiocyanuric acid; 2,4-dithiohydantoins; and dibenzoate derivatives of 2,5-dimercapto 1,3,4-thiadiazole; and a hydrated salt chosen from the group comprising magnesium sulfate heptahydrate, sodium sulfite heptahydrate, sodium citrate pentahydrate and potassium aluminum dodecahydrate.

* * * * *